United States Patent
Xu et al.

(10) Patent No.: US 12,246,764 B2
(45) Date of Patent: Mar. 11, 2025

(54) PORTABLE SAFETY TERMINAL BASED METHOD FOR PROCESSING RAIL TRANSIT RESOURCES, AND SYSTEM FOR METHOD

(71) Applicant: CASCO SIGNAL LTD., Shanghai (CN)

(72) Inventors: Ye Xu, Shanghai (CN); Xiaoyong Wang, Shanghai (CN); Liang Chen, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 311 days.

(21) Appl. No.: 18/003,495

(22) PCT Filed: Sep. 22, 2021

(86) PCT No.: PCT/CN2021/119533
§ 371 (c)(1),
(2) Date: Dec. 27, 2022

(87) PCT Pub. No.: WO2022/188391
PCT Pub. Date: Sep. 15, 2022

(65) Prior Publication Data
US 2023/0234626 A1    Jul. 27, 2023

(30) Foreign Application Priority Data
Mar. 11, 2021  (CN) .......................... 202110264992.9

(51) Int. Cl.
*B61L 27/40*    (2022.01)
*B61L 23/00*    (2006.01)
(Continued)

(52) U.S. Cl.
CPC ............... *B61L 27/40* (2022.01); *B61L 23/00* (2013.01); *B61L 25/025* (2013.01); *B61L 27/04* (2013.01);
(Continued)

(58) Field of Classification Search
CPC .......... B61L 27/40; B61L 27/10; B61L 23/00; B61L 25/025; B61L 27/04; B61L 2027/204
See application file for complete search history.

(56) References Cited

U.S. PATENT DOCUMENTS

2019/0263432 A1* 8/2019 Carlson ................... B61L 27/70
2021/0046961 A1* 2/2021 Whittemore ............ B61L 23/06

FOREIGN PATENT DOCUMENTS

| CN | 108216313 A | 6/2018 |
| CN | 111776013 A | 10/2020 |

(Continued)

OTHER PUBLICATIONS

International Search Report (with English translation) and Written Opinion issued in PCT/CN2021/119533, dated Nov. 22, 2021, 9 pages provided.

*Primary Examiner* — Jacob M Amick
(74) *Attorney, Agent, or Firm* — HSML P. C.

(57) ABSTRACT

The present disclosure relates to a portable safety terminal based method for processing rail transit resources, and a system for the method. The method includes: in a degradation mode, performing interaction between a portable safety terminal and a wayside controller; providing a driver with safety display of an environment where a train is located, and obtaining a location of the train and information of a relationship between a front train and a rear train; and providing the driver with a means to apply for line resources, such that the driver can, according to the train environment, autonomously apply for the line resources, and release the (Continued)

resources for use by subsequent trains after driving the train to pass through a zone. Compared to the prior art, the present disclosure has the advantages of improving the safety of train driving and field maintenance operation, etc.

10 Claims, 3 Drawing Sheets

(51) Int. Cl.
    *B61L 25/02*     (2006.01)
    *B61L 27/04*     (2006.01)
    *B61L 27/10*     (2022.01)
    *B61L 27/20*     (2022.01)

(52) U.S. Cl.
    CPC ......... *B61L 27/20* (2022.01); *B61L 2027/204* (2022.01)

(56) References Cited

FOREIGN PATENT DOCUMENTS

| | | |
|---|---|---|
| CN | 112249097 A | 1/2021 |
| CN | 112406963 A | 2/2021 |
| CN | 12977554 A | 6/2021 |
| EP | 3061666 A1 | 8/2016 |

* cited by examiner

PORTABLE SAFETY TERMINAL BASED METHOD FOR PROCESSING RAIL TRANSIT RESOURCES, AND SYSTEM FOR METHOD

TECHNICAL FIELD

The present disclosure relates to a train signal control technology, in particular to a portable safety terminal based method for processing rail transit resources, and a system for the method.

BACKGROUND

In the normal operation process of urban rail transit lines in China at present, when a carborne system, a train-ground wireless communication system, a wayside control system, or a control center has a fault to cause a train not to continue to operate in a normal automatic train protection/automatic train operation (ATP/ATO) driving mode, a driver usually needs to confirm with a dispatcher to degrade the train driving mode to a restricted manual (RM) driving mode and operate the train at a fixed speed limit; and in case of a major fault of a system or even a need to cut off a carborne ATP system, the train operates in a non-restricted manual (EUM) driving mode. In this degradation mode, the system cannot perform safety protection on the train, and safe operation of the train needs to be jointly ensured and manually protected by the driver and the dispatcher in combination with display of a ground signal, so as to avoid safety risks such as over-speed, switch split, side collision, and rear-end collision. Therefore, to ensure the safe operation of the train in the degradation mode, an operation and maintenance party has formulated a series of degradation disposal processes, plans, operation manuals, etc., the driver needs to communicate with the dispatcher via a radio station for confirmation to understand the location of the train, the dispatcher also needs to handle a corresponding route or block a corresponding zone for the train by reply of the driver to enable the train to obtain line resources required, the driver also needs to obtain a dispatching command allowing train operation from the dispatcher after the resources are confirmed, and so on. These cumbersome mutual confirmation processes increase the time cost of communication, reduce the efficiency of train operation in the degradation mode, and may also lead to ambiguity in communication, resulting in potential safety hazards of train operation.

SUMMARY

To overcome the above defects existing in the prior art, an objective of the present disclosure is to provide a portable safety terminal based method for processing rail transit resources, and a system for the method.

The objective of the present disclosure may be achieved through the following technical solution:

According to one aspect of the present disclosure, provided is a portable safety terminal based method for processing rail transit resources, the method including: in a degradation mode, performing interaction between a portable safety terminal and a wayside controller; providing a driver with safety display of an environment where a train is located, and obtaining a location of the train and information of a relationship between a front train and a rear train; and providing the driver with a means to apply for line resources, such that the driver can, according to the train environment, autonomously apply for the line resources, and release the resources for use by subsequent trains after driving the train to pass through a zone.

As a preferred technical solution, the interaction between a portable safety terminal and a wayside controller includes interaction between safety display information and interaction between safety control commands.

As a preferred technical solution, the interaction between safety display information specifically includes:

obtaining, by the portable safety terminal, information of the line resources and a status of wayside equipment from the wayside controller, and performing display on a display interface.

As a preferred technical solution, the obtained information of the line resources and status of wayside equipment include: the location of the train, a status of track occupation, a position of a switch, a status of a signal, a status of zone blocking, a status of a platform door, a status of a platform emergency close button, and a working status and alarm display of the equipment.

As a preferred technical solution, the interaction between safety control commands specifically includes:

Step 1): after a status of wayside equipment in the environment where the train is located is obtained, applying to the wayside controller for track resources required for train operation and a control authority of the wayside equipment by an operating button on the portable safety terminal, and after the wayside controller confirms that the track resources are not occupied by other controller or the portable safety terminal, authorizing the portable safety terminal to control the track resources;

Step 2): after the control authority of the wayside equipment is obtained, selecting, by the portable safety terminal, corresponding elements, icons, or menus on a display interface to control the corresponding wayside equipment to act; and Step 3): after the control on the wayside equipment is completed and the line resources are obtained, autonomously driving the train to pass through the control zone according to the display on the portable safety terminal; and after the train passes through the control zone, releasing the line resources via the operating button on the portable safety terminal, and returning the control authority of the wayside equipment for continued use by the subsequent trains or the wayside controller.

As a preferred technical solution, the operating button is a physical button or a touch screen.

As a preferred technical solution, the control authority of the wayside equipment is executed by secondary confirmation, a user name/password, or a biological recognition technology, or is executed by combination of a plurality of means.

As a preferred technical solution, actions in Step 2) include: handling of a train route, individual operation of the switch to a normal position/a reverse position, individual locking/individual release of the switch, blocking of the signal/the switch/a section, and activation of the platform emergency close button.

As a preferred technical solution, location information of the train is displayed on the portable safety terminal in various ways; and obtaining the location information of the train specifically includes:

a) obtaining an active train location obtained by the train through a balise and speed and distance measuring equipment via long term evolution (LTE), wireless fidelity (Wifi), fifth-generation (5G), or waveguide tube wireless communication;

b) obtaining the location of the train via Beidou or a global positioning system (GPS); and c) determining a kilometer post of the train on a track by manual confirmation.

According to another aspect of the present disclosure, provided is a system for the portable safety terminal based method for processing rail transit resources, including a portable safety terminal and a wayside controller, where the portable safety terminal communicates with the wayside controller via a wireless channel independent of a main system;

the portable safety terminal interacts with the wayside controller for controlling a train in a degradation mode; or the portable safety terminal interacts with wayside equipment for line maintenance, a status of the wayside equipment is obtained via the portable safety terminal, and a corresponding zone can be blocked, such that a lower track can be maintained.

Compared to the prior art, the present disclosure has the following advantages:

1) The driver and a maintenance operator are provided with the display of the status of the wayside equipment, without obtaining the location of the train or a status of the track from a dispatcher, which improves the safety of train driving and field maintenance operation.

2) The driver and the maintenance operator are provided with a means of directly operating the wayside equipment, without operation by the dispatcher. When the system is degraded, it is authorized to operate the wayside equipment via a safety mechanism of the system, which improves the efficiency of train passing and maintenance operation.

3) Compared to a conventional workstation/server, the safety terminal is convenient to carry and suitable for various field work scenarios.

DETAILED DESCRIPTION OF THE EMBODIMENTS

The technical solutions in the embodiments of the present invention will be clearly and completely described below with reference to the accompanying drawings in the embodiments of the present disclosure. Apparently, the described embodiments are part rather than all of the embodiments of the present disclosure. All other embodiments obtained by those of ordinary skill in the art based on the embodiments of the present disclosure without creative efforts should fall within the scope of protection of the present disclosure.

In an interactive confirmation process of a driver and a dispatcher in a degradation mode, the driver can autonomously obtain line resources according to a location of a train. Through a portable safety terminal in the present disclosure, the driver may be provided with safety display of an environment where the train is located to obtain the location of the train and a relationship between a front train and a rear train; and the driver is provided with a means to apply for line resources, such that the driver can, according to the train environment, autonomously apply for the line resources, and release the resources for use by subsequent trains after driving the train to pass through a zone. In this way, the driver may obtain the line resources without mutual confirmation with the dispatcher to perform autonomous driving, which improves the efficiency of train operation in the degradation mode and also avoids the ambiguity caused by communication. Meanwhile, the present disclosure can also be used for a line maintenance operator to obtain a status of wayside equipment via the portable safety terminal, and can block the corresponding zone, such that a lower track can be maintained.

The present disclosure may be used for a fixed block system, a quasi-moving block system, a moving block system, and signal systems in various modes such as a communication based train control (CBTC) system, a China train control system (CTCS), a European train control system (ETCS), a positive train control (PTC) system, an incremental train control system (ITCS), and a train autonomous control system (TACS). Therefore, the claims of the present disclosure are also applicable to these systems and similar ones.

Figure 1:
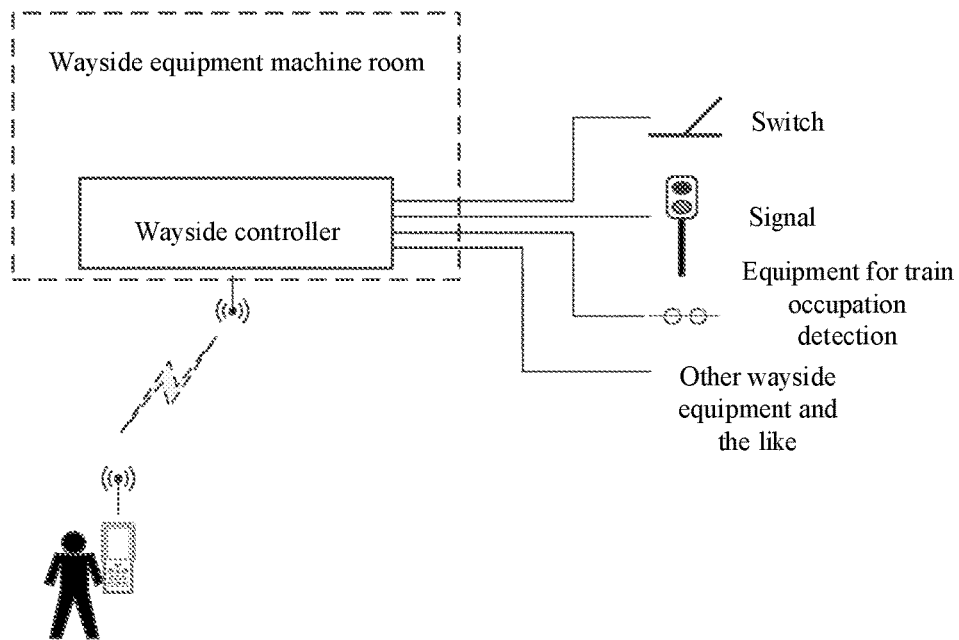
FIG. 1 is a schematic structural diagram of a system in the present disclosure.

The portable safety terminal in the present disclosure is suitable for the driver or the maintenance operator to carry, and communicates with a wayside controller via a wireless channel independent of a main system, as shown in FIG. 1.

Information of interaction between the portable safety terminal and the wayside controller includes safety display information and safety control commands as follows:

1) Safety Display

The portable safety terminal obtains information of the line resources and the status of the wayside equipment from the wayside controller, and performs display on a display interface, where the obtained information of the line resources and status of the wayside equipment include but are not limited to:

the location of the train; a status of track occupation; a position of a switch; a status of a signal; a status of zone blocking; a status of a platform door; a status of a platform emergency close button; a working status and alarm display of the equipment; and other track elements.

2) Safety Control

The safety control function of the portable safety terminal may be operated via a physical button or a touch screen, all of which are within the scope of protection of the present disclosure.

After the status of the wayside equipment in the environment where the train is located is obtained, the driver or the maintenance operator applies to the wayside controller for track resources required for train operation and a control authority of the wayside equipment by an operating button on the portable safety terminal, and after the wayside controller confirms that the track resources are not occupied by other controller or the portable safety terminal, the portable safety terminal is authorized to control the track resources, such that the portable safety terminal obtains the control authority of the wayside equipment. The control authority of the wayside equipment may be executed by a secure means such as secondary confirmation, a user name/password, or a biological recognition technology, or is executed by combination of a plurality of means, all of which are within the scope of protection of the present disclosure.

After the control authority of the wayside equipment is obtained, the driver or the maintenance operator may select corresponding elements, icons, or menus on the display interface to control corresponding wayside equipment to act, where operations include but are not limited to: handling of a train route; individual operation of the switch to a normal position/a reverse position; individual locking/individual release of the switch; blocking of the signal/the switch/a section; activation of the platform emergency close button; and other track elements.

After the control on the wayside equipment is completed and the line resources are obtained, the driver may autonomously drive the train to pass through the control zone according to the display on the portable safety terminal. After the train passes through the control zone, the driver or the maintenance operator releases the line resources via the operating button on the portable safety terminal, and returns the control authority of the wayside equipment for continued use by the subsequent trains or the wayside controller.

Location information of the train may be displayed on the portable safety terminal in various ways of:
a) obtaining an active train location obtained by the train through a balise and speed and distance measuring equipment (including a speed sensor, an accelerometer, and a radar) via long term evolution (LTE), wireless fidelity (Wifi), fifth-generation (5G), or waveguide tube wireless communication;
b) obtaining the location of the train via Beidou or a global positioning system (GPS); and
c) determining a kilometer post of the train on a track by manual confirmation.

The several ways of obtaining the location of the train are within the scope of protection of this patent.

As mentioned above, through the safety display, the safety operation, and the location of the train provided by the portable safety terminal, the driver or the maintenance operator may drive the train autonomously in the degradation mode, which avoids a series of tedious response confirmation processes of confirming the location of the train to the dispatcher, waiting for the dispatcher to apply for and handle the line resources for the train, confirming a dispatching command with the dispatcher, etc., and improves the autonomous operation capability of the train.

Specific Embodiments

The present disclosure is described in detail below with an example where large-area faults of carborne and wayside equipment lead to the degradation mode.

Figure 2:
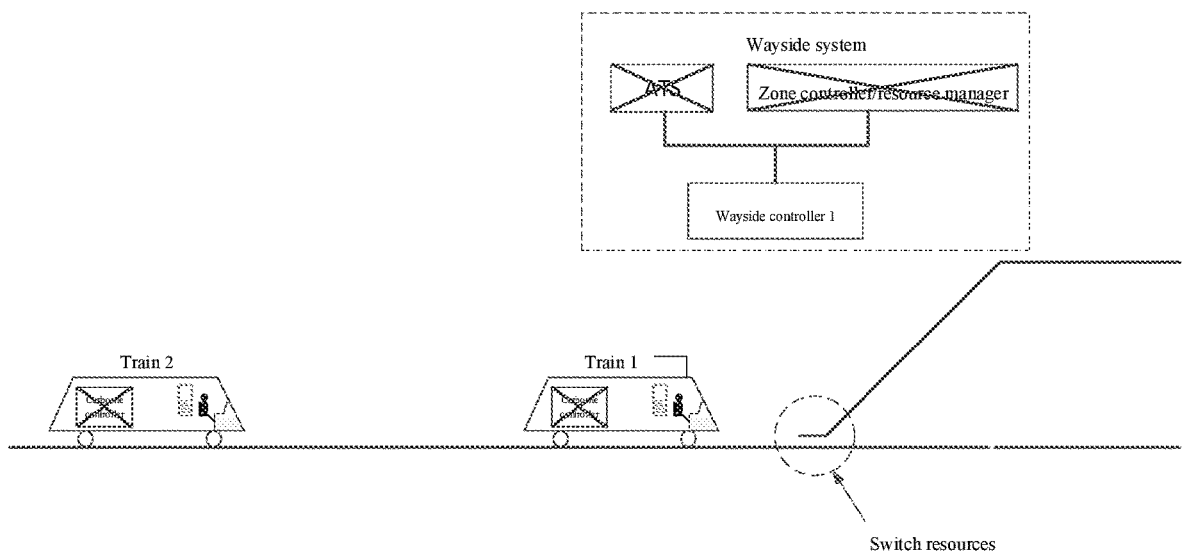
FIG. 2 is a schematic diagram of operation of a train 1 and a train 2 according to display of a safety terminal in an embodiment of the present disclosure.

1) When an automatic train supervision (ATS) system, a zone controller/a resource manager, and a carborne system of the train have faults and only the basic wayside controller works normally, the train should be degraded to operate in a restricted driving mode. The driver may obtain the location of the train and the relationship between the front train and the rear train through the display on the portable safety terminal. For example, a driver of a train 1 knows that there is no other train in front of the train through the interface display, so the train may operate to the front of a next switch; and a driver of a train 2 knows that there is track occupation in front of the train through the interface display, so the driver needs to drive the train to keep an idle section always separated from an occupied section in front to ensure safe operation of the train, as shown in FIG. 2.

Figure 3:
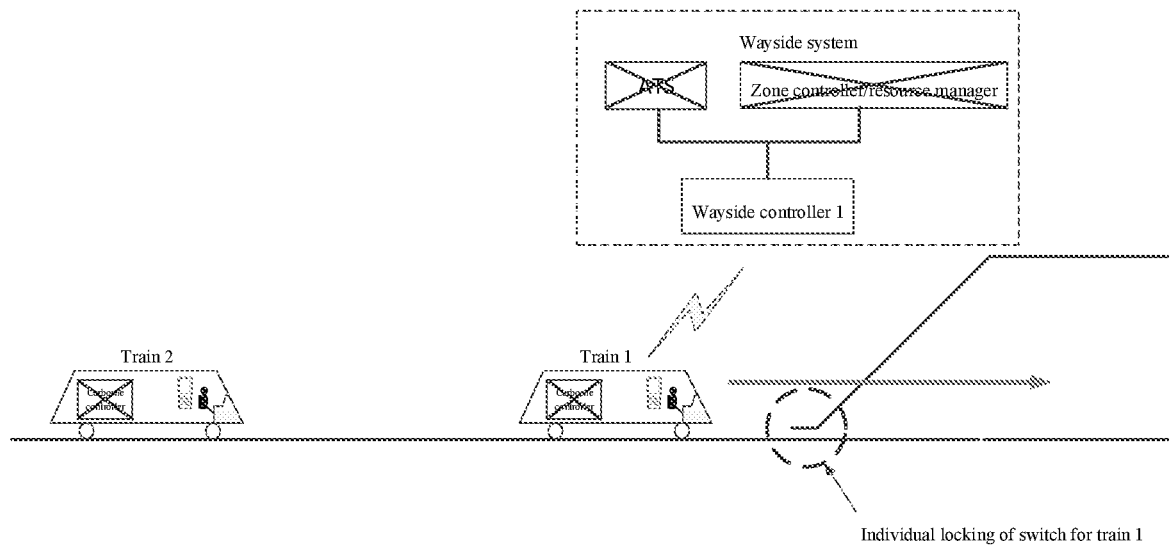
FIG. 3 is a schematic diagram of application for switch resources by a portable safety terminal of a train 1 and individual locking in an embodiment of the present disclosure.

2) The driver of the train 1 applies to the wayside controller for control on switch resources via the portable safety terminal. After the wayside controller confirms that the switch resources are idle, the train 1 is authorized to control the switch resources. After the driver of the train 1 confirms that the position of the switch is correct on the safety terminal, the driver operates the individual locking of the switch, and drives the train to pass through a switch zone after the display confirms that the operation is successful, as shown in FIG. 3.

Figure 4:
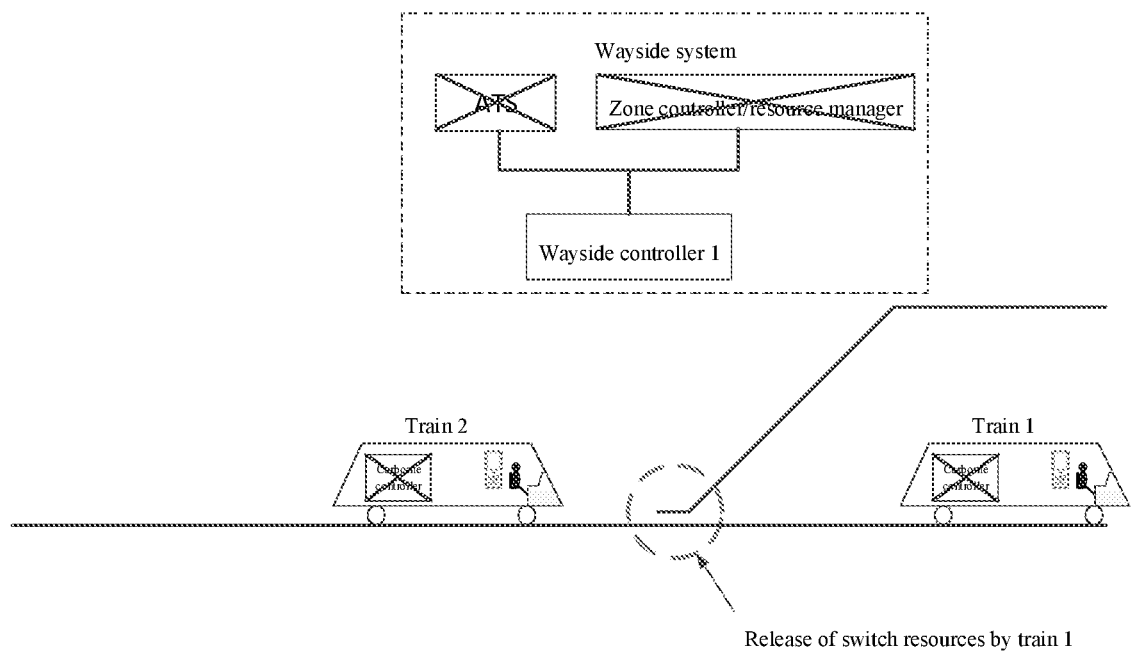
FIG. 4 is a schematic diagram of release of the switch resources by the portable safety terminal of the train 1 in the embodiment of the present disclosure.

3) After the train 1 passes through the switch zone, the driver applies to the wayside controller for unlocking the switch and releasing the control on the switch resources via the portable safety terminal. The wayside controller unlocks the switch and releases the switch resources after confirmation. After the driver of the train 2 observes that the front train passes through the switch zone via the portable safety terminal, the train may move forward to the front of the switch synchronously, as shown in FIG. 4.

Figure 5:
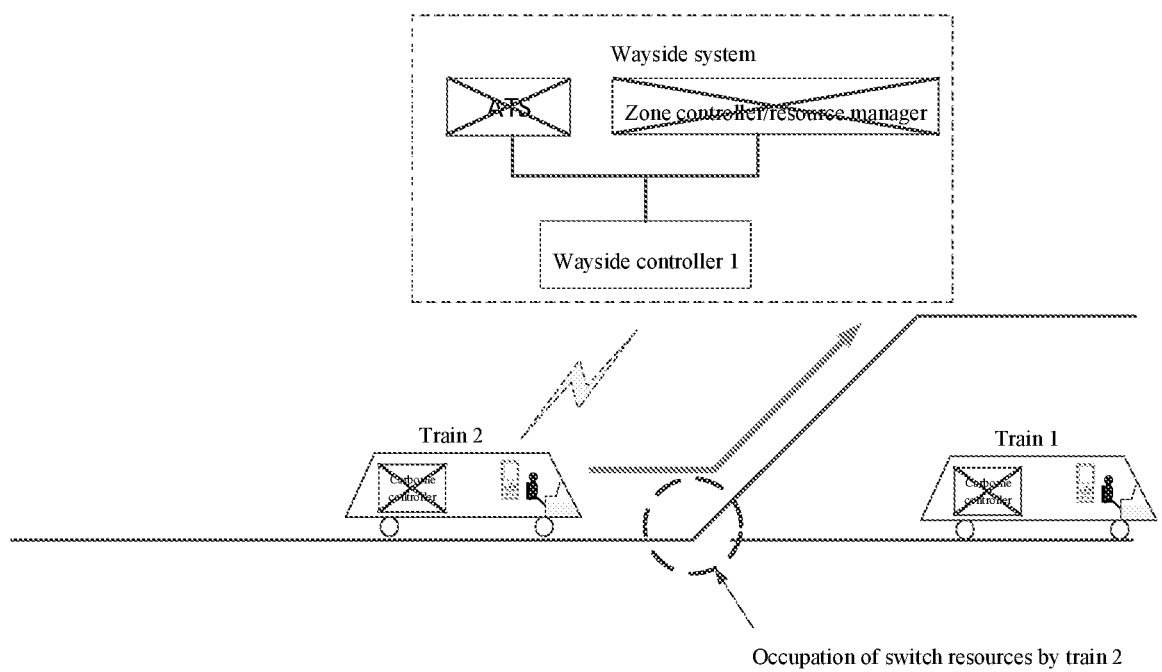
FIG. 5 is a schematic diagram of application for switch resources by a portable safety terminal of a train 2 and individual operation to a reverse position in an embodiment of the present disclosure.

4) The driver of the train 2 applies to the wayside controller for control on the switch resources via the portable safety terminal. After the wayside controller confirms that the switch resources are idle, the train 2 is authorized to control the switch resources. The driver of the train 2 needs to reverse the train to another track via the switch according to an operation mission of the train, so the driver operates the individual operation of the switch to the reverse position on the safety terminal, and drives the train to pass through the switch zone after the display confirms that the operation is successful, as shown in FIG. 5.

The above is only the specific implementation of the present disclosure, but the scope of protection of the present disclosure is not limited thereto. Any of those skilled in the art may easily think of various equivalent modifications or substitutions within the technical scope of the present disclosure, and these modifications or substitutions should be included in the scope of protection of the present disclosure. Therefore, the scope of protection of the present disclosure should be subject to the appended claims.

The invention claimed is:

1. A portable safety terminal based method for processing rail transit resources, the method comprising: in a degradation mode, performing interaction between a portable safety terminal and a wayside controller; providing a driver with safety display of an environment where a train is located, and obtaining a location of the train and information of a relationship between a front train and a rear train; and providing the driver with a means to apply for line resources, such that the driver can, according to the train environment, autonomously apply for the line resources, and release the resources for use by subsequent trains after driving the train to pass through a zone.

2. The portable safety terminal based method for processing rail transit resources according to claim 1, wherein the interaction between a portable safety terminal and a wayside controller comprises interaction between safety display information and interaction between safety control commands.

3. The portable safety terminal based method for processing rail transit resources according to claim 2, wherein the interaction between safety display information specifically comprises:

obtaining, by the portable safety terminal, information of the line resources and a status of wayside equipment from the wayside controller, and performing display on a display interface.

4. The portable safety terminal based method for processing rail transit resources according to claim 3, wherein the obtained information of the line resources and status of wayside equipment comprise: the location of the train, a status of track occupation, a position of a switch, a status of a signal, a status of zone blocking, a status of a platform door, a status of a platform emergency close button, and a working status and alarm display of the equipment.

5. The portable safety terminal based method for processing rail transit resources according to claim 2, wherein the interaction between safety control commands specifically comprises:

Step 1): after a status of wayside equipment in the environment where the train is located is obtained, applying to the wayside controller for track resources required for train operation and a control authority of the wayside equipment by an operating button on the portable safety terminal, and after the wayside controller confirms that the track resources are not occupied by other controller or the portable safety terminal, authorizing the portable safety terminal to control the track resources;

Step 2): after the control authority of the wayside equipment is obtained, selecting, by the portable safety terminal, corresponding elements, icons, or menus on a display interface to control the corresponding wayside equipment to act; and Step 3): after the control on the wayside equipment is completed and the line resources are obtained, autonomously driving the train to pass through the control zone according to the display on the portable safety terminal; and after the train passes through the control zone, releasing the line resources via the operating button on the portable safety terminal, and returning the control authority of the wayside equipment for continued use by the subsequent trains or the wayside controller.

6. The portable safety terminal based method for processing rail transit resources according to claim 5, wherein the operating button is a physical button or a touch screen.

7. The portable safety terminal based method for processing rail transit resources according to claim 5, wherein the control authority of the wayside equipment is executed by secondary confirmation, a user name/password, or a biological recognition technology, or is executed by combination of a plurality of means.

8. The portable safety terminal based method for processing rail transit resources according to claim 5, wherein actions in Step 2) comprise: handling of a train route, individual operation of a switch to a normal position/a reverse position, individual locking/individual release of the switch, blocking of a signal/the switch/a section, and activation of a platform emergency close button.

9. The portable safety terminal based method for processing rail transit resources according to claim 5, wherein location information of the train is displayed on the portable safety terminal in various ways; and obtaining the location information of the train specifically comprises:

a) obtaining an active train location obtained by the train through a balise and speed and distance measuring equipment via long term evolution (LTE), wireless fidelity (Wifi), fifth-generation (5G), or waveguide tube wireless communication;

b) obtaining the location of the train via Beidou or a global positioning system (GPS); and c) determining a kilometer post of the train on a track by manual confirmation.

10. A system for the portable safety terminal based method for processing rail transit resources according to claim 1, comprising a portable safety terminal and a wayside controller, wherein the portable safety terminal communicates with the wayside controller via a wireless channel independent of a main system;

the portable safety terminal interacts with the wayside controller for controlling a train in a degradation mode; or the portable safety terminal interacts with wayside equipment for line maintenance, a status of the wayside equipment is obtained via the portable safety terminal, and a corresponding zone can be blocked, such that a lower track can be maintained.

\* \* \* \* \*